United States Patent [19]

Pascal et al.

[11] Patent Number: 6,055,638

[45] Date of Patent: Apr. 25, 2000

[54] PROCESS AND AUTHENTICATION DEVICE FOR SECURED AUTHENTICATION BETWEEN TWO TERMINALS

[76] Inventors: Thoniel Pascal, 24 Rue André Citroën, 92300 Levallois-Perret; Cottreau Thierry, 15bis, Impasse Rientz, 95120 Ermont, both of France

[21] Appl. No.: 08/911,733

[22] Filed: Aug. 15, 1997

[51] Int. Cl.$^7$ .............................. G06F 11/30; H04L 9/00; H04L 9/32

[52] U.S. Cl. ........................... 713/201; 713/200; 380/23; 340/825.31

[58] Field of Search ..................................... 713/201, 200, 713/202; 380/23, 24, 3, 4; 709/225, 229; 340/825.31, 825.36

[56] References Cited

U.S. PATENT DOCUMENTS

| | | | |
|---|---|---|---|
| 5,276,735 | 1/1994 | Boebert et al. | 380/21 |
| 5,495,533 | 2/1996 | Linehan et al. | 380/21 |
| 5,499,297 | 3/1996 | Boebert | 380/23 |
| 5,560,008 | 9/1996 | Johnson et al. | 713/201 |

*Primary Examiner*—Dieu-Minh T. Le
*Attorney, Agent, or Firm*—Young & Thompson

[57] ABSTRACT

Process and device for secured authentication of the transmission of data between two terminals includes a secured authentication process for the communication between a user's station and a server station, through a communication network, the user's station bring the content of an authentication device depending on information coming from a server station, in which a link is established between the user's station and the server station, a server code is chosen at random at the level of the server station, representative data of the server code are transmitted in a first server-to-user direction, thanks to those data, a corresponding user's code is recognized in the content of the authentication device, the recognized user's code is transmitted in a second user-to-server direction, the user's code is compared with the server code, and the authentication is validated if the user's code is identical to the server code.

8 Claims, 1 Drawing Sheet

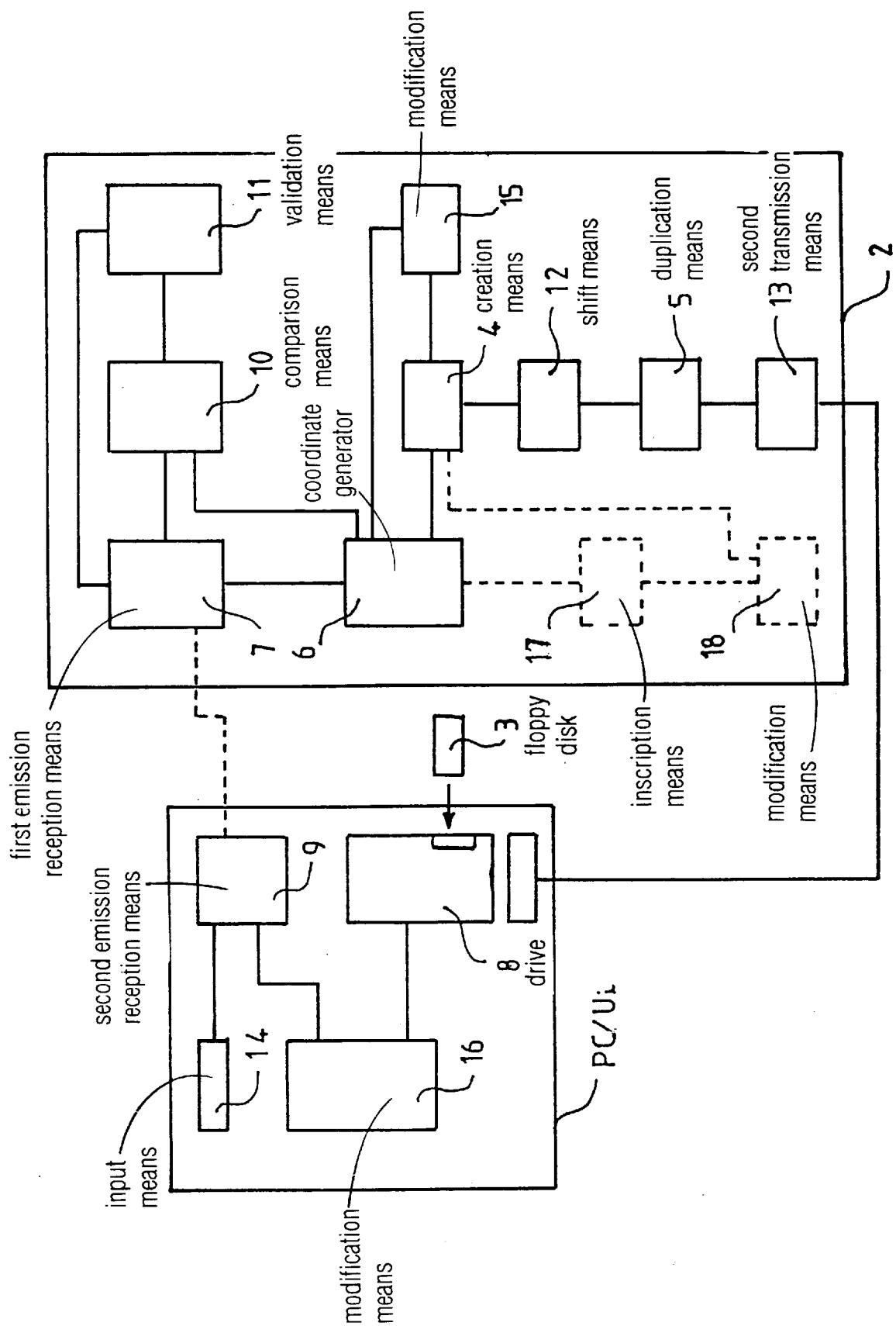

PROCESS AND AUTHENTICATION DEVICE FOR SECURED AUTHENTICATION BETWEEN TWO TERMINALS

BACKGROUND OF THE INVENTION

The invention concerns a secured authentication or identification process for the communication between at least one user terminal and a server as well as a device for carrying out the process.

The invention can be applied, in particular, to reinforce the security of a distant communication network such as Internet, in particular for the validation of purchase-sale bank payments, the banking teleservice, stock exchange orders or any other type of transaction requiring maximal reliability and security.

It is also applicable to the access to business "servers" in the context of "Intranet", to confidential servers, to paying servers or similar.

DESCRIPTION OF THE RELATED ART

Secure authentication processes for the transmission of data between a user terminal and a server through a communication network are known in which, during the access to the server, the user seizes his I.D which is generally a figure-letter code, in order to make known and recognize his identity. This authentication is a logical authentication rendered secure by the seizure of a password.

This information (I.D and password) being forwarded from the terminal to the server through the communication network, it can thus be cracked, by a simple line intercept.

The major disadvantage of this type of process lies in the fact that another person can be connected instead of the user and validate the operation if he has knowledge of the user's I.D and password.

In order to prevent piracy, a process is sometimes used to send coded informations, so that they are unreadable and incomprehensible.

Nevertheless, this encoding process will be common to all the transactions, which is dangerous if the algorithm is "broken".

Encoding remains difficult to individualize: when an encoding algorithm is taken by default by a certain type of attack, all the transactions and "protected accesses" are no longer safe.

Another answer to this problem is to add, to the logical authentication, a physical authentication.

The individual possession of a particular non-duplicable physical device permits the certain authentication of its holder and protects against the diffusion of access codes to convenience users.

A physical authentication is obtainable, for example, with the use of a smart card and its specific drive.

Nevertheless, nowadays, in order to render this process operational in the context of network communication, it would be necessary to equip every personal computer or terminals that can be connected to distant networks with a smartcard drive, which entails a high cost.

Thus physical authentication means the imposition for each user of a personal authentication device, which is necessary.

In addition, in order to have a safe authentication device, each personal device must have a different content and must not be "crackable". In effect, either the personal device has a secret validation of transactions code, this code being present somewhere on the device—even if it is hidden or encoded—and it can thus be discovered in the future through cracking, or this secret code will travel from the user station to the server station through the network and will be crackable, since, once it has been found, it can be used again.

Of course, this code can be encoded during its transfer. Nevertheless, this encoding process will, as in the previous case, be common to all transactions, which can be extremely dangerous if its algorithm is "broken".

Other authentication processes and devices are known, such as the one described in the document WO/91 06904.

In this document, the principle is to give to the user an authentication device made up of a personal grid of information, some slots respectively placed on the Y-axis and on the X-axis of the upper face of the authentication device, and some slides destined to be placed on those slots.

The slides and the slots comprise figures on the X-axis, and letters on the Y-axis.

To enable the authentication to be effected at each transaction, the user is also given:

the co-ordinates that will permit him to identify the challenge among others that the terminal will submit while the transaction is being done, as well as a convention existing between the server and the user to answer the challenge, and a convention existing between the server and the user to answer the response of the challenge.

Thus, in the process described in this document, the user must have knowledge of the co-ordinates, and both conventions, which would imply that the process could be known widely if the conventions are the same for all users, or too difficult to operate if they are different.

This implies that the user must have this information somewhere, information that could be stolen.

In addition, this device, even though it uses a matrix principle, asks the user to make a few manipulations to recognize the challenge he is submitted to, manipulations which can be open to mistakes and thus to the transmission of wrong information.

The state of the art is also represented by the publication "POLONIUS: Identity Authentification System", April 1985, pages 101 to 107.

In this document, the authentication process calls for a known challenge-response principle and in which the link between the information transmitted by the server and the information transmitted by the user can be identified by a third party, and thus on which security is not satisfactory.

In particular, this protocol does not use the matrix principle in the data transmitted at both ends.

Finally, the state of the art is also represented by the U.S. Pat. No. 3,698,605 which concerns a device intended to check the identity of a subscriber to a server before a communication.

This document describes the challenge-response principle according to which the relation between the data transmitted in one direction and those transmitted in the other direction is difficult to establish because some message parts can be obtained at random.

Nevertheless, this system does not suggest the use of matrix and of shift to accomplish this challenge-response.

SUMMARY OF THE INVENTION

The invention aims at overcoming the disadvantages mentioned previously, and to solve the problem of the safeguard of a user in the context of a communication, and particularly a transaction between a user and a server, through a communication network.

To this effect, the invention has for its object a safe authentication process that ensures a quasi absolute authenticity of the communication, namely the user's identity on the network, as well as a quasi inviolability of the validation code in those communications.

It also has for an object a safe authentication process which does not necessitate the modification of the already existing structure of the personal computers used in order to carry out the process, and which calls for a known authentication device, thus easy to use, adapted for users and low prices.

To this effect, the invention proposes a safe authentication process for the communication between at least one terminal and a server, through a communication network, the terminal being more particularly destined to read the content of an authentication device dedicated to the user depending on the information coming from the server, process involving the following steps:

- a) create in the server and in a pseudo-random way, a group of data peculiar to the user called "data-server group", which include specific signs at specific addresses;
- b) duplicate this data-server group on the authentication device dedicated to the user, then called "data-user group";
- c) transmit to the user the dedicated authentication device;
- d) establish a link between the terminal and the server;
- e) generate, in the server and at random, addresses of the data-server group that make it possible to locate a server code;
- f) transmit these addresses in a first server-to-terminal direction;
- g) read in the terminal a user's code formed by the content of all the user data at these addresses already transmitted;
- h) transmit, in a second terminal-to-server direction, the user's code read;
- i) compare the user's code to the server code;
- j) validate the user's authentication if the user's code is identical to the server code.

Thus, the authentication device being adapted to be read by the user's terminal, no additional tools are needed, that is to say, neither a smartcard drive, nor a numerical or an analog decoder.

For example, the data-server group and the user's data group are respectively made up of a server matrix defined by n lines and m columns, the addresses being line-column co-ordinates, the server code being the content of the server matrix at these co-ordinates and the user's code being the content of the user matrix at the co-ordinates transmitted in the first direction.

Let us take for example a matrix of dimension 2, made up of 255 lines and 255 columns, which corresponds to 65 025 cells in which one sign among 62 others is entered (0, 1, . . . , 9, a, b, . . . z, A, B . . . , Z). of course, the choice of signs can be extended to most of the ASCII codes.

For each cell of the matrix, a sign will be chosen at random, during its pseudo-aleatory creation, among the 62.

Consequently, every authorized user has available personal matrices very different from the others.

The link is thus difficult to establish.

In effect, in a challenge-response procedure, what is essential is that the logical link between the data transmitted in a server-to-terminal direction and the data transmitted in the other direction, terminal-to-server, be difficult to establish. In the context of the invention, this link lies on the configuration of the matrix used. Without the knowledge of this matrix, it is impossible to establish this link.

In order to improve the security even more, steps e) to j) are effected each time that a link between the server and the terminal is established.

Thus, even if the information that passes through the network communication is read in clear by a "cracker", it remains difficult to analyze.

In effect, each time a link is established, there is a passage of information of a first type in a first direction and passage of information of a second type in the other direction, such informations being impossible to use again for another link.

In addition, the relation between the information of the first type and that of the second type is almost impossible to determine since it corresponds to a random function.

Finally, if we take again the previous example, let us choose for example 5 couples of line-column co-ordinates, and this, at each transaction. Consequently, the challenge, that is to say the information transmitted in the server-to-terminal direction, corresponds to a series of 10 signs.

The answer corresponding to the user's code is thus made up of 5 signs, each of these signs taking a unique value among the 62 possibilities indicated above. Thus, there are $62^5$ possible user's codes, which is almost equivalent to one billion.

Thus, a specific matrix being created for each user authorized to be connected to the server, we can consider that each user owns the equivalent of a personal bunch of almost a billion codes.

Because, at each new transaction, the server proposes a challenge to the terminal, this challenge consists in sending back only one of those codes chosen precisely among the billion.

It is as if the user and the server or the supervisor of the transaction owned the same bunch of almost a billion codes and secretly agreed at each operation to use only one code at their convenience. This code, in practice, can not be used for the next transaction. Thus, there is one chance out of almost one billion to send back the right code during an attempt at random.

In addition, those user's codes do not exist as such on the authentication device. This code is dynamically generated from the matrix for each transaction.

In accordance with an embodiment of the invention, before step b), it comprises the step which consists in:

- b1) applying, in a pseudo-random manner, a shift function to the data-server group, in order to obtain a shifted data group, following a shift code resulting from the pseudo-random application of the shift function, the shift code being peculiar to each user;
  - the group of duplicated data, on the authentication device dedicated to the user, being the shifted data group;
  - the dedicated shift code being transmitted separately from the authentication device,
  - and before the preparatory step g), the process includes the step that consists in:
- g1) entering, in the terminal, the shift code in order to apply the shift function corresponding to the addresses transmitted and/or to the content of those addresses;
  - the user's code read in the terminal being made up of the content of the data-user group corresponding to the addresses transmitted to which the shift function has been applied, following the dedicated shift code, and/or of the content of the data-user group to which the shift function has been applied.

Of course, in the case of a matrix, each specific sign of this matrix can be generated at random.

Thus, it is not necessary to reestablish in the terminal the shifted data group into the data-user group.

Consequently, the seizure of the shift code by the user is thus compulsory in order to correctly validate the connection. Yet, this shift code exists neither on the authentication device, nor on the server, and never transits on the network.

In other respects, any confidential code that is seized is accepted by the authentication device. Thus, there are no good or bad codes that a third party could try to "break" by trying every single combination outside of the real transactions.

Simply, the seizure of a wrong code validates an answer that does not authorize the connection to the server. Beyond a certain number of incorrect attempts, the data-server group can be automatically destroyed for security reasons.

According to another embodiment, the shift code is chosen by the user and transmitted to the server.

In particular, the shift function is such that at least one random number is added to the addresses and/or to the content of the data-user group and data-server group, the shift code being made up of the random number and being applied (modulo the size of the data group for the addresses and/or modulo the size of the group of specific signs that are admissible, for the content.

According another embodiment, the shift code comprises a series of s signs that have values defined by a predetermined code function, and the shift function successively consists in:
  applying a shift on all the lines of the matrix server, column by column in order to obtain an intermediate shifted matrix; and in
  applying this shift on all the columns of the intermediate shifted matrix, line by line in order to obtain the final shifted matrix;
  the shift consisting in applying the respective value from the first to the last (s) signs of the shift code respectively to the first to the last (s) line or column of the matrix and to repeat this application for the following n–s lines or m–s columns respectively up to n or m.

According to another embodiment of the invention, the data-server group is called data-origin group and the process according to the invention comprises the steps consisting in:
  a1) applying on the data-origin group a shift following a first predetermined code in order to obtain a data group called data-server group,
    the step b1) being accomplished on the data-origin group, and in
  c1) erasing on the server the data-origin group after having accomplished steps b) or b1) and c1).

For example, the data-server group can comprise:
  a first data-server subsystem that serves to determine the address of the beginning and the size of a second data-server subsystem and a complementary code,
  a second data-server subsystem containing specific signs at specific addresses;
  and in that, in step b1):
    the first data-server subsystem is shifted following the shift code;
    the second data-server subsystem is shifted following another code made up of the shifted code completed by the complementary code, the complementary code being partly memorized in the server,
  and in step e), there is also generated in random manner:
    a first number that is representative of the size of the second data-server subsystem,
    a second number that is representative of the address of the begining of the second data-server subsystem and
    a third number called "aggregate" that is representative of the first predetermined code and of the complementary code,
  the user's code being read in the terminal depending on the first, second and third representative numbers.

Finally, to improve the safety of the transaction, after each validated link, the groups of data are modified according to a predetermined function known to the server and the terminal, and as a function of the addresses used during the previous transaction.

According to another embodiment, after each validated link:
  the addresses used on the data-server group are written as unusable;
  the content of the addresses used on the data-user group is modified in random manner.

The invention also concerns a secure authentication system for the communication between at least one user terminal and a server, through a communication network, for the installation of the process according to the invention, characterized in that it comprises:
  an authentication device whose content is intended to be read by the terminal depending on information coming from the server,
  means of creation of pseudo-random data group located in the server station and intended to create a data group peculiar to the dedicated user called "data-server group" containing specific signs at specific addresses,
  means of duplication intended to duplicate this data-server group on the authentication device dedicated to the user, then called "data-user group",
  first means of transmission of the authentication device,
  means located in the server in order to generate in a pseudo-random manner addresses of the data-server group making it possible to locate a code server;
  first emission-reception means located in the server and intended to transmit, to the dedicated terminal, those same addresses;
  reading means intended to read in the authentication device a user's code constituted by the content of the data-server group at those addresses;
  second emission-reception means located in the terminal and intended to transmit to the server the user's code read;
  comparison means adapted to compare the user's code and the server code, and
  validation means intended to validate the authentication of the user if the user's code is identical to the code server.

The authentication device is preferably only identifiable by the user and is separate from the user terminal.

According to an embodiment, the authentication device is a rerecordable magnetic device, such as a floppy disk for example, or optic, such as a CD-ROM (laser disk), or a rerecordable laser disk (CD-R) or a digital versatile disk (D.V.D.), an electronic memory such as ROM, flash memory or electronic chip.

According to another embodiment, the system comprises:
  shift means located in the server and intended to apply, in a pseudo-random way, a shift function to the data-server group, in order to obtain a shifted data group, according to a shift code peculiar to the dedicated user, and which is the result of the application, in a pseudo-random way, of the shift function;

the shifted data group being duplicated on the dedicated authentication device by means of duplication;

second means of transmission of the resulting shift code, distinct from the first means of transmission;

input means located in the terminal and intended to enter, in the terminal, the shift code in order to apply the shift function corresponding to the addresses transmitted and/or to the content of the addresses;

means of reading in the terminal adapted to read a user's code made up of the content of the data-user group corresponding to the addresses transmitted to which the shift function were applied, according to the dedicated shift code.

If the shift code is chosen by the user, it is transmitted to the server by the second transmission means.

In addition, the system according to the invention can comprise data-user groups and data-server groups intended to modify the data groups after each link validated by the validation means and according to a predetermined function known to the server and to the terminal, and depending on the addresses used during the previous link.

In addition, in accordance with another embodiment, the system comprises:

writing means located in the server and intended to write down, after a validated link, as unusable, the addresses used on the data-server group during that link;

modification means located in the terminal and intended to modify in a random manner, after a validated link, the addresses or the content of the addresses used on the data-user group during that link.

BRIEF DESCRIPTION OF THE DRAWINGS

The single drawing FIG. 1 is a schematic representation of a system according to the invention for practicing a process according to the invention.

DESCRIPTION OF THE PREFERRED EMBODIMENT

The invention is explained in a non-limitative way with the aid of an example, in the following description with reference to the single drawing.

In the description of the example, one of the possible applications of the process according to the invention is given, which is the safeguard of "purchase-sale bank payments" for a network such as Internet, by the validation of the customer's identity.

The process can of course be applied, according to the invention, to any other type of communication of information that require the guarantee that the right user is addressed.

The safeguarded identification system comprises a user's terminal PC/U which is generally the Personal Computer of the customer linked to the network, and a server station 2.

Thus, each user has available a personal computer PC/Ui linked to the Internet network.

In this example, the groups of data are represented by matrices.

This being so, the process according to the invention can be applied to any other data group as we will see in the second part of the description.

While they register with the server, each of the authorized users is given two personal matrices:

one which is stored on the server, said to be server matrix MS/Ui;

the other one, the user's matrix or disk matrix MU/Ui, which is stored on a floppy disk 3, which is the authentication device and which is given to the user.

Let U1 to Un be the users authorized to connect themselves to the server and U$\lambda$ the user $\lambda$ which is not authorized to be connected to the server.

The recapitulatory table of the possible communications is as follows:

| SERVER/$U_1$ to $U_n$ | INTERNET NETWORK | PC/$U_i$ |
|---|---|---|
| MS/$U_1$ | <————> | MU/$U_1$ <= $U_1$ |
| MS/$U_2$ | <————> | MU/$U_2$ <= $U_2$ |
| ... | | ... |
| MS/$U_n$ | <————> | MU/$U_n$ <= $U_n$ |
| Ø | | $U_2$ |
| Ø | | |

With:

MS/Ui=server matrix of the user i;

MU/Ui=user matrix of the user i, or floppy disk matrix.

First, a safe and logical authentication can be provided by the seizure of a password. In that case, during his access to the server, the customer seizes, on one hand, his ID, which is in general in the form of figures-letters code, in order to let his identity be known and recognized, and, on the other hand, a password.

In fact, when the user or the customer is accredited for the connexion to a server, the authority, that is to say, the bank for example, gives an ID to the user who chooses his password. Those two elements make if possible to initiate a transaction. The process according to the invention, in fact, definitively validates the transaction.

To this effect, logical authentication is doubled with physical authentication.

Thus, when a link between the customer and the server is established through logical authentication, we will proceed with a second authentication, the information from that second authentication being conceived in such a way as to prevent "piracy".

In addition, the user possesses the floppy disk 3, 3½ inches format. Today, almost every single Personal Computer existing on the market is equipped with floppy disk drive of that format.

The second authentication or physical authentication is accomplished in the following way:

For each authorized user Ui, a server matrix MS/Ui is created by a pseudo-random function F1 that fills in the matrix cells of dimension d, and this, by means 4 of pseudo-random creation of a matrix located in server 2.

The matrix that can be used in the application of the process, is of dimension 2 and comprises 255 lines and 255 columns, which corresponds to 65 025 cells.

For each cell of the matrix (line x, column y), in order to fill in this server matrix MS/Ui, the pseudo-random function F1 chooses "at random" a sign among 62, for example: [0, 1, ... , 9, a, b, ... , z, A, B, ... , Z]. Of course, the choice of signs could be extended to most of the ASCII codes, and even to other types of signs.

Thus, all the authorized users have available their personal matrices which are very different from one another.

In accordance with a first embodiment, the server matrix S/Ui is identical to the MU/Ui user's matrix.

Thus, the server matrix MS/Ui, created by the server 2 for the user Ui, is copied or duplicated on floppy disk 3 of that user, through duplication means 5 located in the server 2 and linked to means 4 and that particular floppy disk 3 is transmitted to the user in question, through a transmission means not shown such as for example by postmail.

Each attempt at connection to the server 2 corresponds to a transaction ti'.

After a conventional logical authentication step (ID and password transmitted via the network), the authorized user Ui is subjected, from the server 2, to a challenge-response procedure in order to authentify his identity, in compliance to the process according to the invention.

Let us take, in order to simplify, a server matrix with three lines and three columns:

| | | |
|---|---|---|
| a | x | 2 |
| f | 8 | t |
| r | q | s |

At each transaction, means 6 located in the server 2 generate, according to a pseudo-random function F2, two couples of co-ordinates (lines, columns).

These couples are sent to the terminal PC/Ui of the user Ui, ia the network, through first emission-reception means 7 located in the server 2: this is the challenge.

In the server matrix MS/Ui, the content of these co-ordinates represents the server code CS.

The user receives the information via second emission-reception means 9 and is then invited to place his personal floppy disk 3 in a drive 8 of his terminal PC/Ui.

Let us take for example the co-ordinates (1, 1) and (3, 2).
Thus, F2ti'(M)=(1, 1), (3, 2)=1132.

In the example in consideration, the diagram is as follows:

| INTERNET NETWORK Challenge = 1132 | | | | | | | |
|---|---|---|---|---|---|---|---|
| MS/U$_i$ | | | | MU/U$_i$ | | | |
| a | x | 2 | => | a | x | s | |
| f | 8 | t | | f | 8 | t | |
| r | q | s | <= | r | q | s | |
| | | | response = aq | | | | |

A function V makes it possible to read the value corresponding to those couple of co-ordinates. This function V is applied, through means 6, on the server matrix MS/Ui present on the server 2 in order to obtain, on the one hand, the server code CS and, through drive 8, on the user's matrix present on floppy disk 3, in order to obtain a user's code CU on the other hand.

Thus, we obtain, for user Ui:

CS=V(MS/Ui, F2ti')=a, q=aq, and

CU=V(MU/Ui, F2ti')=a, q=aq

The user's code CU obtained with floppy disk 3 is sent, through second emission-reception means 9, to the server 2 via the network: this is the response. The server 2 compares the two codes CU and CS through comparison means 10:

- if they are identical, that is to say that V(MS/Ui, F2ti')= V(MU/Ui, F2ti'), then validation means 11 validate the authentication of the user and the connection to the server 2 is authorized for that user;
- if they are different, that is to say that V(MS/Ui, F2ti') ≠V(MU/Ui, F2ti'), then the authorized user is not authentified and the connection to the server 2 is refused.

At each new transaction, the server 2 proposes a new challenge to the authentication device.

It is perfectly understood that the information transmitted in the first server-to-user direction is different in nature from the information transmitted in the second user-to-server direction, which prevents a third party from establishing a correlation or a logical link between those two types of information.

That being said, the invention is applied to any data group containing specific signs at specific addresses.

To increase security in case of a robbery, which was not noticed, of the authentication device 3, the process according to the invention also associates an almost impregnable code to the authentication device 3. This code is also called shift code CD.

After the creation of the server matrix MS/Ui in the server by creation means 4, the server matrix MS/Ui is in fact not memorized identically on the authentication device 3.

Thus, shift means 12 located in the server 2 apply a shift function to the server matrix MS/Ui to generate a new so-called shifted matrix MD/Ui which is duplicated on the floppy disk in order to form a new user's matrix:

$$D(F3, MS/Ui)=MD/Ui=MU/Ui$$

where F3 is a pseudo-random function generating shift codes for each matrix and thus for each user.

Each shift code CD is transmitted to the user in question by second transmission means 13 distinct from the first transmission means, and will have to be seized by the user at each transaction by input means 14 located in the terminal.

Thus, the user's code CU will be made up of the content of the user's matrix MU/Ui corresponding to the co-ordinates transmitted (challenge) to which the shifted function D has been applied.

According to a first embodiment, the shifted function D is such that at all the line co-ordinates of the matrix, a first number u is added, given by the pseudo-random function F3 (for example +1) and that at all the column co-ordinates of the matrix, a second number v is added by the pseudo-random function F3 (for example +2).

The shift code is then made up of the first and second numbers uv.

Of course, this shift is accomplished modulo the number of n lines of the matrix and modulo the number of m columns.

In the example that follows, let us take 12 as the shift code which consists in adding 1 to the lines and 2 to the columns.

From our starting example, we obtain:

| MS/U$_i$ | | | | MD/U$_i$ = MU/U$_i$ | | |
|---|---|---|---|---|---|---|
| a | x | 2 | D (line +1, column +2) | q | s | r |
| f | 8 | t | or D$_{12}$ | x | 2 | a |
| r | q | s | => | 8 | t | f |

Let us take our transaction $t_i'$ again.

Without the seizure of the shift code uv on the terminal, the user's code CU is erroneous.

| MS/U$_i$ | | | | MU/U$_i$ or MD/U$_i$ | | |
|---|---|---|---|---|---|---|
| a | x | 2 | 1132 | q | s | r |
| f | 8 | t | => | x | 2 | a |
| r | q | s | <= | 8 | t | f |
| | | | qt | | | |

Because:

V(MS/Ui, 1132)=aq and V(MD/Ui, 1132)=qt aq≠qt

The connection is refused.

By seizing, on the terminal, the right shift code which is applied to the co-ordinates of the challenge, the user's code obtained is correct.

| MS/U$_i$ | | | | MU/U$_i$ or MD/U$_i$ | | |
|---|---|---|---|---|---|---|
| a | x | 2 | 1132 | q | s | r |
| f | 8 | t | 1132 corrected by shift code gives 2311 | x | 2 | a |
| r | q | s | <= | 8 | t | f |
| | | | aq | | | |

Because:

V(MS/Ui, 1132)=aq and V(MD/Ui, D12(1132))=V(MD/Ui, 2311)=aq aq=aq

The connection is authorized.

Thus, generally, we obtain:

$$V(MS/Ui, F2ti')=V'MD/Ui, Duv(F2ti'))$$

On the contrary, any seizure of erroneous shift code Du'v' with (u', v')≠(u, v) will result in an incorrect user's code such as:

$$V(MS/Ui, F2ti')≠V(MU/Ui, Du'v'(F2ti'))$$

In addition, it can be forecasted that, whatever shift code CD may be seized by the user on the authentication device 3, this is accepted by the reading program. Thus, there is no good or bad shift code CD that a "cracker" could try to "break".

Of course, this shift code CD is not present in any form on the authentication device 3, never transits on the communication network, and is not explicitly present on the server 2. Thus, it is almost impregnable.

In the embodiment previously described, the shift function used D+u+v is very simple. It is thus possible to establish the link between the server matrix MS/Ui and the user's matrix MU/Ui if the user's matrix MU/Ui is known and if we assist in a few transactions in clear which each time inform us on:

$$F2ti'(M) \text{ and } V(MU/Ui, Duv(F2ti'))$$

That is to say, in the example, (1, 1) (3, 2) where "1132" gives "aq" taking into account u and v.

In that case and in the light of a few transactions, it is possible to deduce u and v from it and consequently, to discover the shift code's value CD.

Yet, this necessitates four preliminary conditions:

1. To physically steal the user's floppy disk 3.

2. To duplicate this floppy disk 3 or to read and rewrite the user's matrix present on this floppy disk 3.

3. To give back the floppy disk to the user without him noticing the theft.

4. To assist in a certain number of ti' transactions after the theft.

And this, even more so since floppy disk 3 can be protected against copying, duplication and decompilation for example by the COPY CONTROL© process, world leader in its category.

The possibility thus becomes very slight but it exists. Thus explaining the possibility to resort to a second embodiment that uses a shift function D' much more complex than D.

If it is considered that the shift code CD comprises a series of s signs which have values defined by a shift function D', the shift function successively consists in:

applying a shift on all the lines of the server matrix, column by column, in order to obtain an intermediate shifted matrix; and applying this shift on all the columns of intermediate shifted matrix, line after line, in order to obtain the final shifted matrix;

the shift consisting in applying the respective value of the first symbol of the shift code respectively to the first to last (s) line or column of the matrix and to reiterate this application for the following n–s lines or m–s columns up to respectively n or m.

Let us take for example a shift code made up of five signs, namely f, r, 1, 2, C, the pre-determined coded function being the known ASCII conversion.

In this case, the value corresponding to f is 102, the value corresponding to r is 114, the value corresponding to 1 is 49, the value corresponding to 2 is 50 and the value corresponding to r is 67.

Consequently, first of all, the shift function D' consists in applying on the first column C1 of the server matrix a shift of +102; on the second column C2 of the matrix, a shift of +114; on the third column C3 of the matrix, a shift of +49; on the fourth column C4 of the matrix, a shift of +50; on the fifth column C5 of the matrix, a shift of +67; and to reiterate this operation for the C6 until C10, C11 until C15, until the last column Cm of the matrix.

If the function D' is represented in the form of a diagram, the following result is obtained:

| Shift code | f | r | 1 | 2 | C | f | r | 1 | 2 | C | f... |
|---|---|---|---|---|---|---|---|---|---|---|---|
| ASCII value | 102 | 114 | 49 | 50 | 67 | 102 | 114 | 49 | 50 | 67 | 102 ... |
| Applied shift | +102 | +114 | +49 | +50 | +67 | +102 | +114 | +49 | +50 | +67 | +102 ... |
| N° of the related column | 1 | 2 | 3 | 4 | 5 | 6 | 7 | 8 | 9 | 10 | 11.... |
| All the coordinates of the lines of this column | | | | | | | | | | | |

Second of all, this same type of shift is applied on the intermediate shifted matrix but this time, on all the column co-ordinates, line by line, in order to obtain the definite shifted matrix.

The following diagram gives the result which was obtained:

| On line shift code | Applied shift | N° of the line of the resulting matrix | N° of the line of N initial matrix for the column 1 | N° of the line of N initial matrix for the column 2 | ... |
|---|---|---|---|---|---|
| f | +102 | 1 | 154 | 142 | |
| r | +114 | 2 | 155 | 143 | |
| 1 | +49 | 3 | 156 | 144 | |
| 2 | +50 | 4 | 157 | 145 | |
| C | +67 | 5 | 158 | 146 | |
| f | +102 | 6 | 159 | 147 | |
| ... | ... | ... | ... | ... | |

The value X=154 is found according to the equation X+114=255+1.

The value X=142 is found according to the equation X+114=255+1, etc. . . .

Of course, the bigger the shift code, the more difficult the link between the server matrix MS/Ui and the user's matrix will be to establish. Consequently, the bigger the shift code, the more likely the possibility of discovering this shift code starting from the user's matrix and a certain number of transaction results is close to zero.

To conclude, the necessary conditions for a pirate to be connected on the server by usurping the identity of an authorized user are so disproportionate that the risk is close to zero.

Thus, there is an authentication of the authorized users by authentication thanks to an individual physical device:
  without additional equipment for the terminal,
  with a physical support whose unitary cost is much lower than any other equivalent system.

The bigger the shift code, the safer it is. But also, the more difficult it is to memorize for the user. This implies either a constraint of use for the user (one more code to memorize), or the writing of this code, which makes it easy to discover by a third party. This is the actual problem of symmetrical and asymmetrical encoding keys which are much too long.

In the previously described examples, the authorized user receives his floppy disk by postmail during its registration at the server, and then by another separate postmail, his associated shift code created by the server.

A variant embodiment consists in requesting each authorized user to choose his own shift code. This code is transmitted by the user to the server by the second transmission means 13 such as for example by postmail or telephone or any other type of transmission. It is then applied to shift the user's matrix, which will be duplicated.

This code can correspond for example to any text of from 7 to 20 signs. A correspondence table established once and for all, gives the numerical shift to apply according to each sign.

Let us take for example the correspondence table:

| Sign | 0 | 1 | ...9 | a | b | ...z | A | B | ...Z | é | è | à | ... |
|---|---|---|---|---|---|---|---|---|---|---|---|---|---|
| Shift (+) | 1 | 2 | ...10 | 11 | 12 | ...36 | 37 | 38 | ...62 | 63 | 64 | 65 | ...73 |

The following shift is obtained for example for the code "Fort Knox":

| Sign | F | o | r | t | | K | n | o | x |
|---|---|---|---|---|---|---|---|---|---|
| Shift (+) | 42 | 35 | 28 | 30 | | 73 | 47 | 24 | 25 | 34 |

The user's matrix is thus shifted compared to the server's matrix following the shift function $D'_{Fort\ Knox}$ and this user will be invited, at each transaction, to seize his own shift code ("Fort Knox") necessary to obtain the connection to the server.

This variant of the shift code solves in practice the problem of too long keys impossible to memorize.

The primary function of the process according to the invention is the authentication. Yet it is possible to use this process for electronic signature by applying the property of encoding starting from a matrix.

In that case, two users Ui and Uj are linked to server 2 which performs the role of an intermediary.

The message to encode is cut up sign by sign. Each sign to be encoded is the subject of a query on the server's matrix which gives all the couples of co-ordinates (line-column) corresponding to that sign, the equivalent in the previous examples of more than 1000 possible couples per sign with a matrix of 65025 cells.

Then, a pseudo-random function F4 chooses "at random" a couple among those 1000 and so on for each sign of the plain text. The result obtained, is an encoded message represented by a series of signs which correspond to the couples of co-ordinates which were selected.

Since there are 1000 possibilities for each sign, the same plain text will thus be encoded differently each time, which renders impossible the cryptanalysis by letter frequency. The user must enter his shift code prior to this process.

If, for example, Paul (Ui) wants to sign a document sent to Valerie (Uj) and that Valerie wants to be certain that the document is really signed by Paul, and Paul must not be able to deny his signature, the steps will be as follows:

Paul encodes his name with his matrix and his shift code: MU/Uj (shift code), "Paul")=4 couples of co-ordinates (line, column)=S/Ui=signature code.

This signature code S/Ui (by MU/Ui) is sent to the server with the name of the addressee Uj. The server authenticates the transmitter Ui with the process according to the invention and then decodes the signature of ui with his server's matrix MU/Ui. It obtains "Paul": this is the second verification of the transmitter.

The server then uses the server's matrix of the addressee Uj, MS/Uj, to encode "Paul" (without the shift code known only to Valérie):

MS/Uj ("Paul")=4 couples of co-ordinates (line-column)= S'Ui.

This signature code S'/Ui (by MS/Uj) is sent to the addressee Uj. The server authenticates Uj with a process according to the invention. Then Uj decodes the signature of Ui with the user's matrix MU/Uj and its shift code: he obtains "Paul".

Valérie is thus certain of Paul's signature and Paul cannot deny his signature.

This electronic signature necessitates from the transmitter and from the addressee the use of their own authentication device 3 and the seizure of their own shift code. However the server does not have knowledge of these shift codes during the transaction, which makes it a perfectly neutral intermediary.

In accordance with another embodiment, for exploitation reasons and in particular to limit the storage space of the matrix on the server as on the physical device of the user (when it is not a floppy disk), it may be interesting to use smaller matrices with fewer cells. In that case, the security of the process is diminished compared to a direct attack by a reading in clear of the transactions on the network, by reconstitution of the matrix.

In that case, the process according to the invention forecasts that after each validated link, the data groups are modified simultaneously, by modification means 15 and 16, according to a predetermined function known to the server and the terminal, and depending on the addresses used during the previous transaction.

This principle consists in fact in regenerating, as they are used, the server matrix MS/Ui and the user's matrix MU/Ui at the level of their respective cells revealed during the transactions.

Let us take an example of a diagram of regeneration peculiar to the two matrices of the user Ui called GR/Ui:

After having sent the user's code from the user's terminal towards the server, the 5 signs of the user's code used are replaced by the corresponding substitution values (according to the diagram) once the connection has been validated by the server.

Thus, the logical reconstitution of the server matrix by direct reading on the network is impossible because each cell used is modified as and, when needed in accordance with a regeneration diagram kept secret and that never transits on the network.

Consequently, a matrix with its associated regeneration diagram can have a size largely smaller than M(255,255)= 65025 cells while keeping the same level of security.

Another solution consists in that after each link or validated transaction:

- the addresses used or the content of the addresses used on the data-server group are written, by inscription means 17, as being unusable;
- the addresses or the content of the addresses used on the data-user group are modified at random by modification means 18 located in the terminal.

This is the equivalent of regenerating, as they are used, the server matrix MS/Ui and the user's matrix MU/Ui to the level of their respective cells which are revealed during the transactions, but, this time, without using a regeneration diagram as in the previous case.

On the server, all the used cells of the server matrix MS/Ui are made blank, so that they may not be used again during a subsequent transaction. On the floppy disk, a pseudo-random function F5 replaces the signs of the used cells on MU/Ui after each valid connection with other signs chosen at random. These signs cannot be subsequently called since the corresponding co-ordinates were rendered unusable on the server matrix MS/Ui.

When the cracker tries to find the shift code again starting from his data base constituted by the "challenge-response" of the previous transactions and of the stolen floppy disk's user's matrix MU/Ui, his program is biased due to the absence of correspondence between the cells due to their random replacement.

The connection to the server immediately after the theft of the floppy disk, without having assisted in clear in legitimate transactions, is thus impossible, because the shift code CD cannot be found again.

In addition, it is not necessary to keep, in the server station, the shifted matrix and/or the shift code.

This shift principle can also be forecasted, for example, at the level of the server station in order to reinforce the security of the server.

To this effect, certain groups of server matrices present on the server station can be periodically shifted and thus

| Initial sign | 0 | 1 | 2 | 3 | 4 | 6 | 6 | 7 | 8 | 9 | a | b | c | ... | Y | Z |
|---|---|---|---|---|---|---|---|---|---|---|---|---|---|---|---|---|
| Substitution sign | t | 4 | c | M | L | d | z | q | O | f | i | o | G | | 7 | W |

The line of substitution signs is created by a random shuffle to change the previous order for the 62 signs from 0 to Z.

A specific regeneration diagram (GR/Ui) is attributed to each couple of matrices (MS and MU) for each user. Each diagram corresponds to some extent to the "genetic code" for that couple of matrices.

At each transaction, for example 5 couples of co-ordinates of the matrix and their 5 corresponding values are used.

become dependent before their reading of the seizure of a daily code effected by the administrator of the server. This precaution renders even more random the outside analysis of the figures and codes that transit through communication networks.

Of course, this daily code could be definite and/or memorized on a device independent of the server.

In the previous description, the example considered, to simplify the explanation, used matrices.

However, the process according to the invention can be applied to any other type of data group containing specific signs at specific addresses.

In that case, the challenge, such as it has been previously defined, is made up of the data-server group and the code server is made up of the content of the data-server group at these addresses.

Similarly, the user's code is made up of the content of the data-user group at the addresses transmitted during the challenge.

To improve the security of the transaction, even more the data-server group can comprise:

a first data-server subsystem that serves to determine the starting address and the size of the second data-server subsystem, and a complementary code CC, a second data-server subsystem containing specific signs at specific addresses.

In that case, before duplicating the overall data-server group, the first subsystem is shifted according to the previously mentioned shift code CD, and the second data-server subsystem is shifted according to another code C made up of the shift code CD completed by complementary code CC, the complementary code being memorized at least in part in the server.

The data-server group thus shifted is then duplicated on the authentication device and the authentication device and the shift code are transmitted to the user separately.

The user does not know the complementary code.

After having established a link between the terminal and the server, three numbers are generated at random, namely:

a first number representative of the size of the second data subsystem, a second number representative of the starting address of the second data-server subsystem, and a third number called "aggregate" representative of the complementary code CC.

Nevertheless, the way in which the size and the address are interpreted as well as the complementary code in the first and second representative numbers, cannot be determined by an outside person.

Then, during the transaction, when the user has entered his shift code, the user's code is read in the terminal according to the first, second and third representative numbers.

To this effect, functions that are adapted to re-establish the relations between the first, second and third representative numbers and their content, are memorized either in the terminal or in the authentication device.

Thus, the data that are transmitted through the network, if they are intercepted, can not be interpreted by "cracking".

In accordance with an example, the embodiment described previously will comprise the following steps:

the server determines at random the size of the second data subsystem which is going to be used for the transaction, and the address of this second subsystem, by searching in the first data subsystem, the addresses of the first subsystem are sought for which will subsequently permit the terminal to determine the size and the starting address of the second data subsystem, the server multiplies the size of the second data subsystem thus obtained by a random number, thus obtaining a very high value (multiple rotation), the server chooses aleatorily a temporary shift of the second data subsystem, the server creates a number (called aggregate) made up of the addition of the multiple rotation's value, the temporary shift and of the complementary shift, in a first server-to-user direction, the starting address of the second data subsystem, the addresses representative of the size of the second data subsystem used for the transaction, as well as the addresses representative of parts of the second data subsystem (challenge) and the aggregate, are transmitted.

In the terminal:

the user seizes his shift code CD;

the terminal determines the size of the second data subsystem used and the starting address thanks to the first data subsystem;

the terminal divides the aggregate by the size of the second data subsystem, obtaining a shift complement. This complement is composed of the temporary shift and of the complementary code;

the final shift is calculated by adding the complementary code and the shift code;

the transmitted displacements are applied;

once the sought after value has been found (user's code), a value transformation rule can be applied taking into account the application of the shift code;

the user's code or response to the challenge is transmitted in a second user-to-server direction, that is to say the values found at the spot of the transmitted displacements.

In the server:

the shift is calculated by adding the complementary code CC and the temporary shift in order to give the final shift;

the displacements transmitted to obtain the code server are applied;

the result is compared with the user's code sent; and the authentication is confirmed or infirmed and the response is sent to the user.

We claim:

1. Secured authentication process for the communication between a least one user terminal (PC/Ui) and a server through a communication network, the terminal being intended, in particular, to read the content of an authentication device dedicated to the user depending on information coming from the server, process comprising steps of:

a) creating, in the server and in a pseudo-random manner, a data group peculiar to the user called data-server group, containing specific signs at specific addresses;

b) duplicating this data-server group on the authentication device dedicated to the user, then called data-user group;

c) transmitting to the user the dedicated authentication device;

d) establishing a link between the terminal (PC/Ui) and the server;

e) generating, in the server and in a pseudo-random way, addresses of the data-server group making it possible to locate a server code (CS);

f) transmitting these addresses in a first server-to-terminal direction;

g) reading in the terminal (PC/Ui) a user's code made up of the content of the data-user group at these transmitted addresses;

h) transmitting in a second terminal-to-server direction the user's code (CU) which was read;

i) comparing the user's code (CU) with the server code (CS); and j) validating the user's authentication if the user's code (CU) is identical to the server code (CS), wherein before step b), it comprises the step which consists in:

b1) applicating, in a pseudo-random manner, a shift function (D) to the data-server group, in order to obtain a shifted data group (MD/Ui), according to a shift code (CD) which results from the application of a pseudo-random shift function (D), the code (CD) being proper to each user;

the data group duplicated on the authentication device (3) dedicated to the user being the shifted data group (MD/Ui);

the dedicated shift code (CD) being separately transmitted from the authentication device (3), and before the operational step g), the process also comprises the step which consists in:

g1) entering, in the terminal, the dedicated shift code (CD) in order to apply the shift function corresponding to the addresses transmitted or to the content of these addresses;

the user's code (CU) read in the terminal (PC/Ui) being made up of the content of the data-user group corresponding to the addresses transmitted to which a shift function (D) has been applied, according to the dedicated shift code (CD) or to the content of the data-user group to which a shift function (D) has been applied.

2. Process according to claim 1, wherein the shift code (CD) is chosen by the user and transmitted to the server (2).

3. Process according to claim 1, wherein the shift function (D) is such that at least one random number is added to the addresses or to the content of the data-user group and data-server group, the shift code (D) being constituted by the random number and being applied modulo the size of the data group for the addresses or modulo the size of the group of specific signs that are admissible, for the content.

4. Process according to claim 1, wherein the shift code (D) comprises a series of s signs which have values defined by a predetermined encoding function, and the shift function (D) successively comprises:

applying a shift on all the lines of the server matrix (MS/Ui), column by column, in order to obtain an intermediate shifted matrix; and applying this shift on all the columns of the intermediate shifted matrix, line after line, in order to obtain a shifted matrix (MD/Ui);

the shift comprising applying the respective value from the first until the last (s) sign of the shift code (CD) respectively to the first until the last line (s) or column of the matrix and to reiterate this application for the following n–s lines or m–s columns up to respectively n or m.

5. Process according to claim 1, wherein the data-server group comprises:

a first server data subsystem that serves to determine the starting address and the size of a second server data subsystem and a complementary code (CC), a second server data subsystem containing specific signs at specific addresses;

and in that in step b1):

the first server data subsystem is shifted according to the shift code (CD);

the second server data subsystem is shifted according to another code (C) constituted of the shift code (CD) completed by the complementary code (CC), the complementary code (CC) being memorized at least in part in the server (2), and in step e) there are also generated at random:

a first number representative of the size of the second server data subsystem;

a second number representative of the starting address of the second server data subsystem; and a third number called aggregate, representative of the first predetermined code and of the complementary code (CC), the user's code (CU) being read in the terminal depending on the first, second and third representative numbers.

6. Process according claim 5, wherein the size and the starting address of the second data subsystem are determined in a pseudo-random way while being included in a predetermined interval.

7. Secured authentication system for communication between at least one user's terminal (PC/Ui) and the server, through a communication network, comprising:

an authentication device whose content is intended to be read by the user's terminal (PC/Ui) depending on information coming from the server;

a means for creation of a data group in a pseudo-random way located in the server station and intended to create a data group peculiar to the dedicated user called data-server group containing specific signs at specific addresses;

a duplication means intended to duplicate this data-server group on the authentication device dedicated to the user, then called data-user group;

a means located in the server in order to generate in a pseudo-random way, addresses of the data-server group which make it possible to locate the server code (CS);

a first emission-reception means located in the server and intended to transmit to the dedicated terminal (PC/Ui) these addresses;

a reading means intended to read in the authentication device a user's code (CU) constituted by the content of the data-user group at the addresses;

a second emission-reception means located in the terminal (PC/Ui) and intended to transmit to the server the user's code (CU) read;

a comparison means able to compare the user's code (CU) with the server code (CS);

a validation means intended to validate the user's authentication if the user's code (CU) is identical to the server code (CS);

a shift means located in the server and intended to apply in a pseudo-random way a shift function (D or D') to the data-server group, in order to obtain a shifted data group, according to a shift code (CD) peculiar to the dedicated user and resulting in the pseudo-random application of the shift function (D, D'), the a shifted data group being duplicated on the authentication device dedicated by first transmission means;

a second transmission means of the shift code (CD), distinct from the first means of transmission; and an input means located in the terminal and intended to enter in the terminal the shift code (CD) in order to apply the shift function (D, D') corresponding to the addresses transmitted or to the content of these addresses, the reading means in the terminal being adapted to read a user's code (CU) constituted by the content of the data-user group corresponding to the addresses transmitted to which the shift function (D, D') has been applied, according to the dedicated shift code (CD).

8. System according to claim 7, wherein the shifted code (CD) is chosen by the user and is transmitted to the server (2) by the second transmission means (13).

* * * * *

UNITED STATES PATENT AND TRADEMARK OFFICE
CERTIFICATE OF CORRECTION

PATENT NO. : 6,055,638
DATED : April 25, 2000
INVENTOR(S) : Pascal Thoniel et al.

It is certified that error appears in the above-identified patent and that said Letters Patent is hereby corrected as shown below:

<u>Title page,</u>
Item [19], change "Pascal et al." to -- Thoniel et al. --.
Rewrite Item [75] as follows:
-- [75] Inventors: Pascal Thoniel, 24 Rue André Citroën, 92300 Levallois-Perret; Thierry Cottreau, 15bis, Impassee Rientz, 95120 Ermont, both of France --.

Signed and Sealed this

Twenty-first Day of August, 2001

Attest:

*Nicholas P. Godici*

NICHOLAS P. GODICI
*Acting Director of the United States Patent and Trademark Office*

*Attesting Officer*